(12) United States Patent
Kon

(10) Patent No.: US 7,199,326 B2
(45) Date of Patent: Apr. 3, 2007

(54) JIG AND METHOD FOR POSITIONING SPOT WELDING ELECTRODE

(75) Inventor: Hiroyuki Kon, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 11/135,121

(22) Filed: May 23, 2005

(65) Prior Publication Data

US 2005/0263495 A1 Dec. 1, 2005

(30) Foreign Application Priority Data

May 25, 2004 (JP) ............................. 2004-154571

(51) Int. Cl.
*B23K 11/11* (2006.01)
(52) U.S. Cl. ................. 219/86.33; 219/86.24
(58) Field of Classification Search ............. 219/86.33, 219/86.24
See application file for complete search history.

(56) References Cited

U.S. PATENT DOCUMENTS 3,204,083 A * 8/1965 Fromm et al. ............. 219/127

6,559,405 B2 * 5/2003 Mehl ........................ 219/60 A

FOREIGN PATENT DOCUMENTS

| JP | 06-155039 | 6/1994 |
| JP | 08-071765 | 3/1996 |
| JP | 09-271955 | 10/1997 |
| JP | 2004-082168 | 3/2004 |

* cited by examiner

*Primary Examiner*—Len Tran
(74) *Attorney, Agent, or Firm*—Rankin, Hill, Porter & Clark LLP

(57) ABSTRACT

A positioning jig for a spot-welding electrode includes an attaching portion for temporarily attaching to a workpiece. A positioning portion of the jig is disposed in parallel to a central axis of the attaching portion and spaced from the central axis. The positioning portion has an imaginary central axis coinciding with the central axis of the attaching portion. With the attaching portion attached to that part of a workpiece surface which is to be spot welded, the electrode is set on the central axis of the attaching portion. An inclination of the electrode is corrected to make the electrode stand parallel to the positioning portion such that, even when the workpiece surface is curved, the electrode can be positioned perpendicularly to the workpiece surface part to be spot welded.

3 Claims, 7 Drawing Sheets

JIG AND METHOD FOR POSITIONING SPOT WELDING ELECTRODE

FIELD OF THE INVENTION

The present invention relates to positioning of an electrode of a spot welder.

BACKGROUND OF THE INVENTION

It is important to set suitable values of electric currents, select suitable positions of electrodes and, especially, position the electrodes perpendicularly to portions of workpieces to be subjected to spot welding, so as to provide high quality of spot-welded portions of the workpieces. Positioning jigs have been used in positioning electrodes for spot welding, as disclosed in, for example, JP-A-2004-82168. The disclosed positioning jig for use in positioning an electrode will be discussed with reference to FIG. 13 and FIG. 14 hereof.

FIG. 13 illustrates the conventional positioning jig designated at 100 for positioning an electrode 105 for spot welding. The jig 100 includes an attaching portion 103 for magnetically attaching to a surface 102 of a flat workpiece 101, and a bar-shaped positioning portion 104 extending upwardly from the attaching portion 103 and disposed perpendicularly to the surface 102 of the workpiece 101.

The positioning portion 104 has a lower part spaced an interval Y1 from the electrode 105. The positioning portion 104 has an upper part spaced an interval Y2 from the electrode 105. When the interval Y1 is found to be equal to the interval Y2 through comparison of the interval Y1 with the interval Y2, the electrode 105 is disposed in parallel to the positioning portion 104 and therefore the electrode 105 is found to be appropriately positioned. When the interval Y1 is different from the interval Y2, the electrode 105 is inclined relative to the positioning portion 104. Therefore, the inclination of the electrode 105 is corrected to make the interval Y1 equal to the interval Y2.

When the workpiece 101 is curved, as shown in FIG. 14, however, the electrode 105 is not disposed in parallel to the positioning portion 104. In this case, if a posture of the electrode 105 is adjusted to make the interval Y1 equal to the interval Y2, the electrode 105 is not disposed perpendicularly to a portion of the workpiece 101 to be subjected to spot welding. With the electrode 105 disposed not perpendicularly to the portion of the workpiece 101, spot welding can not be satisfactorily performed on the portion of the workpiece. For the positioning jig 100, therefore, it is impossible to appropriately evaluate a posture of the electrode on the basis of the intervals Y1, Y2 when the workpiece is curved as shown in FIG. 14.

To address the above problem, there is a demand for a technique capable of positioning an electrode perpendicularly to a portion of a workpiece to be subjected to spot welding, regardless of whether the workpiece is flat or curved.

SUMMARY OF THE INVENTION

According to a first aspect of the present invention, there is provided a jig for positioning an electrode by correcting an inclination of the electrode relative to surfaces of workpieces to be spot-welded together, the jig comprising: an attaching portion for temporarily attaching to the workpiece; a positioning portion disposed in parallel to a central axis of the attaching portion and offset from the central axis; and an interconnecting portion interconnecting the attaching portion and the positioning portion.

With the jig thus arranged, the electrode can be positioned perpendicularly to a portion (a welding target portion) of the workpiece to be subjected to the spot welding. Because the inclination of the electrode is corrected with reference to the positioning portion disposed in parallel to the central axis of the attaching portion, the electrode can be positioned perpendicularly to the portion of the workpiece subjected to spot welding, even when the workpiece is not flat but curved. Thus, it becomes possible to readily, accurately check whether the electrode is appropriately positioned, regardless of a configuration of the workpiece.

Preferably, the positioning portion is connected through the interconnecting portion to the attaching portion in such a manner as to revolve on the attaching portion. Generally, the inclination of the electrode relative to two directions, typically, a right-and-left direction and a front-and-rear direction should be checked in positioning the electrode. In the preferred embodiment, the positioning portion is arranged to revolve on the attaching portion. After the inclination of the electrode in one direction is corrected, the positioning portion can revolve on the attaching portion through 90 degrees for correction of the inclination of the electrode in the other direction. Thus, the positioning of the electrode can be efficiently performed.

Desirably, the positioning portion includes a rotary shaft offset from the central axis of the attaching portion, and an elliptic or circular cylinder secured to the rotary shaft in eccentric relation to the rotary shaft. With this arrangement, the circular or elliptic cylinder can be rotated by rotation of the rotary shaft to thereby contact or come close to the electrode. Therefore, the inclination of the electrode can be more readily corrected with the result that the positioning of the electrode can be performed with improved efficiency.

In a preferred form, the positioning portion is disposed on the interconnecting portion in such a manner as to slide in a direction perpendicular to the central axis of the attaching portion between a central axis position on the central axis and an offset position offset from the central axis position, the positioning portion being selectively positioned at the central axis position and the offset position. Since the positioning portion is sidable on the interconnecting portion between the central axis position and the offset position, the positioning jig can change a form of measurement of the inclination of the electrode in correspondence to type of a workpiece. Moreover, because the positioning portion is slidable, the positioning portion can contact or come close to the electrode for readily checking the inclination of the electrode with reference to the positioning portion.

According to a second aspect of the present invention, there is provided a method for positioning an electrode by correcting an inclination of the electrode relative to surfaces of workpieces to be spot-welded together, the method comprising the steps of: providing a jig having an attaching portion for temporarily attaching to the workpiece, a positioning portion disposed in parallel to a central axis of the attaching portion and offset from the central axis, and an interconnecting portion interconnecting the attaching portion and the positioning portion; temporarily attaching the attaching portion to that part of a workpiece surface which is subjected to spot welding; setting the electrode on the interconnecting portion to bring a central axis of the electrode into coincidence with the central axis of the attaching portion; correcting the inclination of the electrode with reference to the positioning portion to direct the electrode perpendicularly to the surface of the portion of the workpiece; removing the jig from the workpiece; and advancing the electrode into contact with that part of the workpiece surface to be spot-welded.

Preferably, the positioning portion includes a rotary shaft offset from the central axis of the attaching portion, and an elliptic or circular cylinder attached to the rotary shaft in eccentric relation to the rotary shaft, and wherein the inclination of the electrode is corrected with reference to the elliptic or circular cylinder.

Desirably, the positioning portion is disposed on the interconnecting portion in such a manner as to slide in a direction perpendicular to the central axis of the attaching portion between a central axis position on the central axis of the attaching portion and an offset position offset from the central axis position, and wherein the step of setting the electrode on the interconnecting portion comprises sliding the positioning portion along the interconnecting portion to select one of the central axis position and the offset position in correspondence to a configuration of the workpiece surface.

Thus, the positioning portion can slide to be selectively located on the two positions, and hence form of measurement of the inclination of the electrode can be changed to correspond to a flat or curved surface of the workpiece. Therefore, the electrode can be quickly accurately positioned regardless of a configuration of the workpiece.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

The following description is merely exemplary in nature and is in no way intended to limit the application or its uses.

Figure 1:
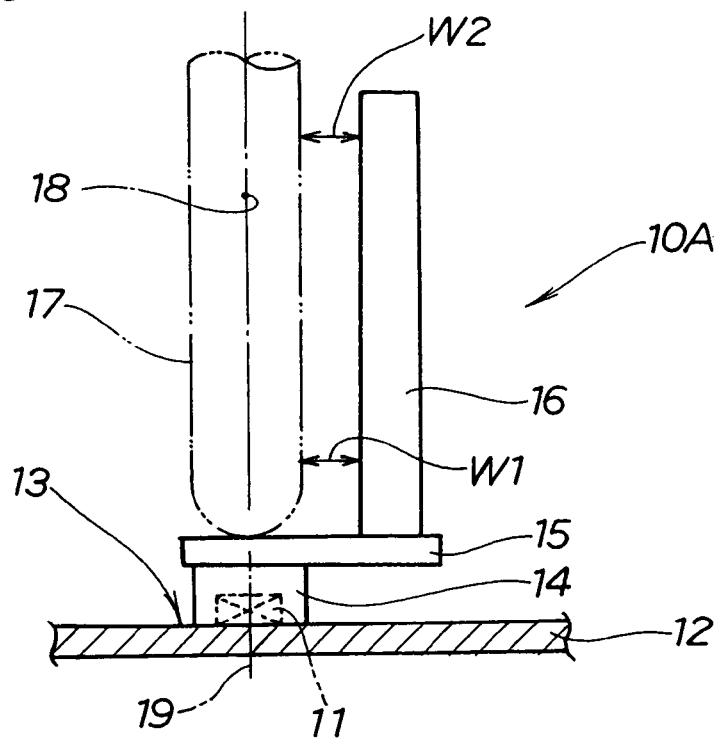
FIG. 1 is a view showing a jig for positioning an electrode for spot welding according to a first embodiment of the present invention.
Figure 2A:
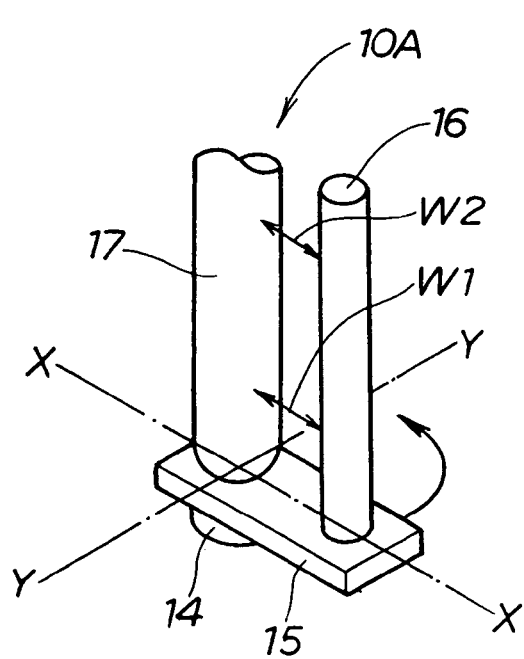
FIG. 2A and FIG. 2B are views showing an example of use of the jig shown in FIG. 1.
Figure 2B:
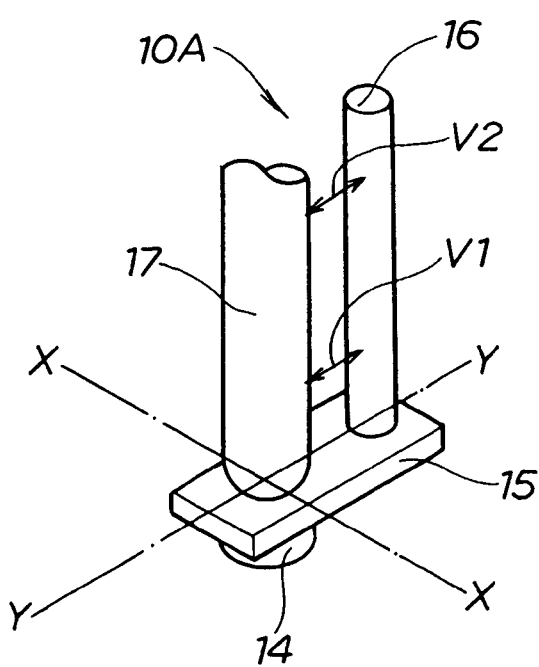
Figure 3:
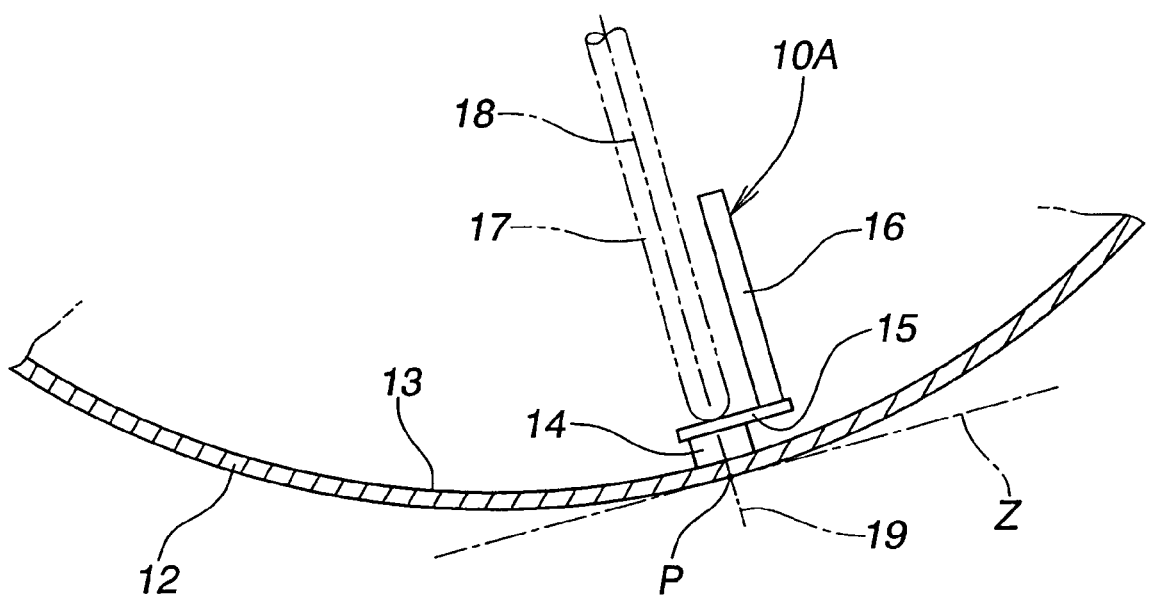
FIG. 3 is a view showing that the jig according to the first embodiment is used for a curved workpiece.

Referring to FIG. 1 through FIG. 3, there is shown a jig 10A for positioning an electrode of a spot welder, according to a first embodiment of the present invention. The jig 10A will be hereinafter referred to as "positioning jig 10A".

The positioning jig 10A includes an attaching portion 14 with a permanent magnet 11 and is capable of magnetically attaching to a surface 13 of a workpiece 12, an interconnecting portion 15 extending horizontally from an upper surface of the attaching portion 14, and a bar-shaped positioning portion 16 extending upwardly from the interconnecting portion 15 and directed perpendicularly to the interconnecting portion 15.

The attaching portion 14 attaches to the workpiece 12 by the action of the permanent magnet 11 incorporated in the attaching portion 14.

The attaching portion 14 has its central axis 19 generally coinciding with a central axis 18 of an electrode 17. The positioning portion 16 is disposed at a position offset from the central axis 18 of the electrode 17. That is, the positioning portion 16 is disposed on the interconnecting portion 15 in parallel to the central axis 19 of the attaching portion 14 and is offset from the electrode 17. The positioning portion 16 thus has an imaginary central axis identical to the central axis of the attaching portion. The interconnecting portion 15 is horizontally disposed at right angles to the attaching portion 14. The positioning portion 16 is disposed perpendicularly to the interconnecting portion 15. Accordingly, when the electrode 17 is disposed in parallel to the positioning portion 16, the central axis 18 of the electrode 17 generally coincides with the central axis 19 of the attaching portion 14.

The attaching portion 14, the interconnecting portion 15 and the positioning portion 16 are arranged in the above-mentioned relation. The positioning portion 16 is secured to the attaching portion 14 through the interconnecting portion 15.

Although, in fact, two, three or four workpieces 12 to be spot-welded together lie one over the other, a single workpiece 12 will be illustrated in FIGS. 1, 3, 4, 5, 10, 11, 12A and 12B for convenience of illustration.

Description will be made as to how the positioning jig 10A is used. First, with the electrode 17 spaced away from the workpiece 12, the attaching portion 14 attaches to that part (welding portion) of the workpiece surface 13 which is to be spot-welded to another workpiece 12 (not shown). The positioning jig 10A is thus set on the surface 13 of the workpiece 12. Then, the electrode 17 is brought closely to the interconnecting portion 15.

A lower interval W1 between a lower portion of the positioning portion 16 and the electrode 17 is measured and then an upper interval W2 between an upper portion of the positioning portion 16 and the electrode 17 is measured for checking whether the electrode 17 is inclined. The lower and upper intervals W1, W2 can be manually measured using a scale or other appropriate tools such as, preferably, a thickness gage.

When the electrode 17 is inclined, the lower interval W1 and the upper interval W2 are measured. The inclination of the electrode 17 is then adjusted along an axis X—X in such a manner as to make the lower interval W1 equal to the upper interval W2, as shown in FIG. 2A. When the lower interval W1 is made equal to the upper interval W2, the inclination of the central axis 18 of the electrode 17 with respect to the axis X—X is corrected.

Next, the attaching portion 14 is removed from the workpiece 12 and the positioning jig 10A is turned through 90 degrees as shown in FIG. 2A. The thus turned positioning jig 10A is shown in FIG. 2B.

After turning of the positioning jig 10A, the attaching portion 14 attaches again to the welding portion of the workpiece 12. Subsequently, the electrode 17 is brought closely to the interconnecting portion 15.

A lower interval V1 between the lower portion of the positioning portion 16 and the electrode 17 is measured and then an upper interval V2 between the upper portion of the positioning portion 16 and the electrode 17 is measured for checking whether the electrode 17 is inclined.

When the electrode 17 is inclined, the lower interval V1 between the lower portion of the positioning portion 16 and the electrode 17 is measured and the upper interval V2 between the upper portion of the positioning portion 16 and the electrode 17 is measured. Then, the inclination of the electrode 17 is adjusted along the axis Y—Y in such a manner as to make the lower interval V1 equal to the upper interval V2. When the lower interval V1 is made equal to the upper interval V2, the inclination of the central axis 18 of the electrode 17 with respect to the axis Y—Y is corrected.

Since the inclinations of the electrode 17 with respect to the both axes X—X and Y—Y are corrected, the electrode 17 can be rendered parallel to the positioning portion 16. Thus, the central axis 18 of the electrode 17 coincides with the central axis 19 of the attaching portion 14. When the workpiece 17 is a flat sheet, the electrode 17 is fixed perpendicularly to the surface 13 of the workpiece 17.

Thereafter, the positioning jig 10A is removed from the workpiece 12, and the electrode 17 is applied to the surface 13 of the welding portion of the workpiece 12 for spot welding.

Discussion will be made in relation to FIG. 3 as to how the positioning jig 10A is used for a workpiece 12 having a curved surface.

As shown in FIG. 3, the attaching portion 14 of the positioning jig 10A is attached to a curved surface 13 of a welding portion P to thereby set the positioning jig 10A on the curved surface 13 of the workpiece 12. The interconnecting portion 15 is disposed in parallel to a tangential line Z passing through the welding portion P. The positioning portion 16 is disposed perpendicularly to the tangential line Z. A tip end portion of the electrode 17 is then brought into abutment on the interconnecting portion 15.

Next, as explained in relation to FIG. 2A, the lower interval W1 between the lower portion of the positioning portion 16 and the electrode 17 is measured and then the upper interval W2 between the upper portion of the positioning portion 16 and the electrode 17 is measured for checking whether the electrode 17 is inclined relative to the positioning portion 16.

When the electrode 17 is inclined relative to the positioning portion 16, the intervals W1, W2 are measured and then the inclination of the electrode 17 is adjusted along the X—X axis in such a manner as to make the intervals W1, W2 equal to each other for correcting the inclination of the electrode 17 with respect to the axis X—X.

Next, as explained in relation to FIG. 2B, the attaching portion 14 is removed from the workpiece 12 and the positioning jig 10A is turned through 90 degrees. Thereafter, the attaching portion 14 is again attached to the welding portion P of the workpiece 12. Then, the tip end portion of the electrode 17 is brought into abutment on the interconnecting portion 15.

The lower interval V1 between the lower portion of the positioning portion 16 and the electrode 17 is measured and then the upper interval V2 between the upper portion of the positioning portion 16 and the electrode 17 is measured for checking whether the electrode 17 is inclined relative to the positioning portion 16.

When the electrode 17 is inclined relative to the positioning portion 16, the intervals V1, V2 are measured and the inclination of the electrode 17 is adjusted along the axis Y—Y in such a manner as to make the intervals V1, V2 equal to each other. When the lower interval V1 and the upper interval V2 become equal to each other, the inclination of the central axis 18 of the electrode 17 with respect to the axis Y—Y is corrected.

Therefore, the central axis 18 of the electrode 17 coincides with the central axis 19 of the attaching portion 14 and hence, even when the workpiece 12 is curved, the central axis 18 is directed perpendicularly to the tangential line passing through the welding portion P. With this arrangement, the electrode 17 is disposed in position relative to the attaching portion 14. Accordingly, the position of the electrode 17 can be easily, accurately checked regardless of the configuration of the workpiece 12.

Figure 4:
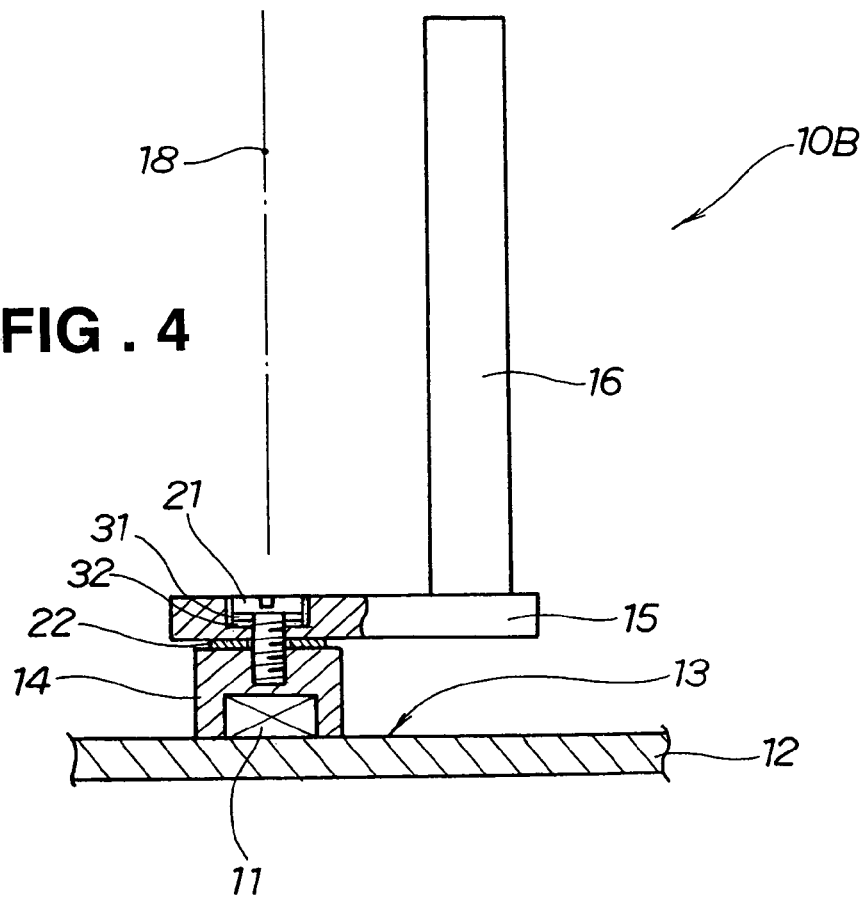
FIG. 4 is a view showing partly in cross-section a jig for positioning an electrode for spot welding according to a second embodiment of the present invention.

FIG. 4 illustrates a jig 10B (hereinafter referred to as "positioning jig 10B") for positioning an electrode of a spot welder according to a second embodiment of the present invention.

The positioning jig 10B in the second embodiment of the present invention is the same as the positioning jig 10A in the first embodiment of the present invention except that an interconnecting portion 15 of the positioning jig 10B can turn relative to an attaching portion 14.

The interconnecting portion 15 of the positioning jig 10B is rotatably attached by a screw 21 to the attaching portion 14 with a lubricative spacer 22 interposed therebetween. By virtue of a spring washer 31 and a plain washer 32 interposed between the screw 21 and the interconnecting portion 15, rotational force applied to the interconnecting portion 15 can be adjusted by adjustment of a degree to which the screw 21 is fastened to the interconnecting portion 15.

It is to be noted that the spacer 22 may be eliminated if contact area between the attaching portion 14 and the interconnecting portion 15 is rendered lubricative.

By virtue of the interconnecting portion 15 arranged to turn relative to the attaching portion 14, the intervals W1, W2, V1, V2 between a positioning portion 16 and an electrode 17 can be efficiently measured because the interconnecting portion 15 directed in a direction of the axis X—X can be readily turned to be directed in a direction of the axis Y—Y without removal of the attaching portion 14 from the workpiece 12 as discussed in relation to FIG. 2A and FIG. 2B. Therefore, it is unlikely that the attaching portion 14 is displaced from the welding portion P due to the removal from the workpiece 12.

The positioning jig 10B in the second embodiment can be used for a curved workpiece as well as a flat workpiece 12, as can the positioning jig 10A in the first embodiment.

Figure 5:
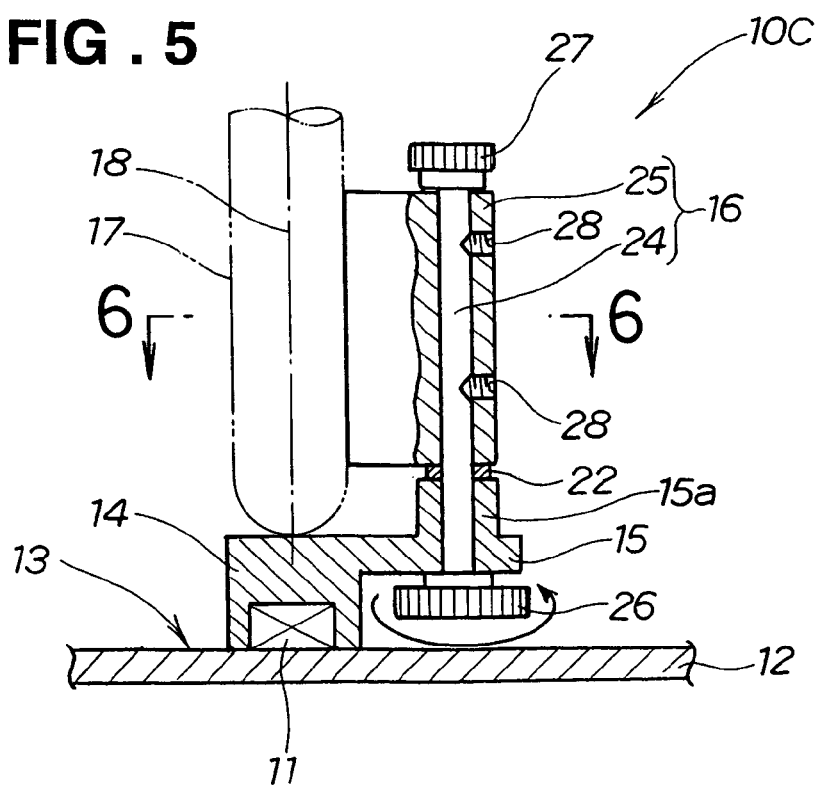
FIG. 5 is a cross-sectional view of a jig for positioning an electrode for spot welding according to a third embodiment of the present invention.
Figure 6:
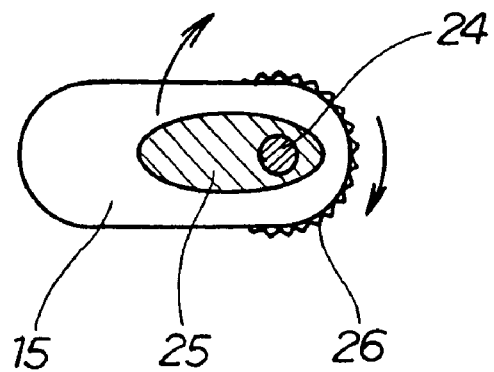
FIG. 6 is a cross-sectional view taken along line 6—6 of FIG. 5.
Figure 7:
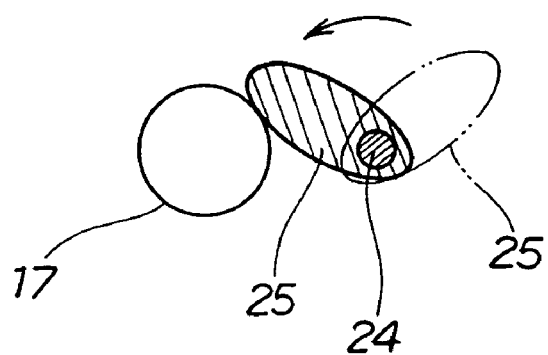
FIG. 7 is a view showing a motion of an elliptic cylinder shown in FIG. 6.

FIG. 5 through FIG. 7 show a jig 10C (hereinafter referred to as "positioning jig 10C") for positioning an electrode of a spot welder according to a third embodiment of the present invention.

The positioning jig 10C in the third embodiment includes an attaching portion 14 incorporating therein a single-piece magnet 11, and an interconnecting portion 15. The positioning jig 10C further includes a positioning portion 16 extending upwardly from the interconnecting portion 15 and disposed perpendicularly to the interconnecting portion 15. The attaching portion 14 has a central axis 19 coinciding with a central axis 18 of an electrode 17.

The positioning portion 16 includes a rotary shaft 24 offset from the central axis 18 of the electrode 17, and an elliptic cylinder 25 mounted on the rotary shaft 24. The rotary shaft 24 is eccentric to the elliptic cylinder 25, that is, the rotary shaft 24 is offset from a central axis of the elliptic cylinder 25. The rotary shaft 24 has a lower end to which a primary dial 26 is attached for rotating the rotary shaft 24. The rotary shaft 24 has an upper end to which a secondary dial 27 is attached for rotating the rotary shaft 24 in the same manner as the primary dial 26. Either of the primary dial 26 and the secondary dial 27 is used in measuring an inclination of the electrode 17. Although the rotary shaft 24 may be equipped with at least one of the dials 26, 27, the primary dial 26 is preferably used if only one dial is selected. The reason why the primary dial 26 is preferred to the secondary dial 27 is that since the primary dial 26 is disposed in the vicinity of the interconnecting portion 15 supporting the rotary shaft 24, the primary dial 26 rotates the rotary shaft 24 without applying a bending force to the rotary shaft 24, that is, without deforming the rotary shaft 24.

The elliptic cylinder 25 is secured to the rotary shaft 24 by means of plural screws 28. Between a lower end of the elliptic cylinder 25 and a boss portion 15a integral with the interconnecting portion 15, there is interposed a lubricative spacer 22.

Discussion will be made in relation to FIG. 6 and FIG. 7 as to how the positioning jig 10C is used.

First, the primary dial 26 is rotated clockwise to rotate the rotary shaft 24 for turning the elliptic cylinder 25 clockwise, as shown in FIG. 6, so that the interconnecting portion 15 provides a place for the electrode 17 to be positioned. The elliptic cylinder 25 is in a position shown by a dash line of FIG. 7.

Second, the electrode 17 is placed on the interconnecting portion 15 (FIG. 6), after which the primary dial 26 (FIG. 6) is rotated back (counterclockwise) to bring the elliptic cylinder 25 into contact with the electrode 17, as shown by a solid line of FIG. 7. When no gap is formed between the electrode 17 and the elliptic cylinder 25, the electrode 17 is disposed in parallel to the elliptic cylinder 25. When a gap is formed between the electrode 17 and the elliptic cylinder 25, the inclination of the electrode 17 is corrected to provide no gap between the electrode 17 and the elliptic cylinder 25. By the use of the positioning jig 10C, the inclination of the electrode 17 can be adjusted in a short time because whether the electrode 17 is inclined can be visually checked. In the previously discussed first embodiment, the intervals W1, W2 between the electrode 17 and the positioning portion 16 should be measured using a measuring tool, for example, a thickness gage for adjusting the inclination of the electrode. In contrast, in the third embodiment, such a measuring tool as required in the first embodiment need not be used and hence the inclination of the electrode 17 can be checked and corrected in a shorter time.

Figure 8:
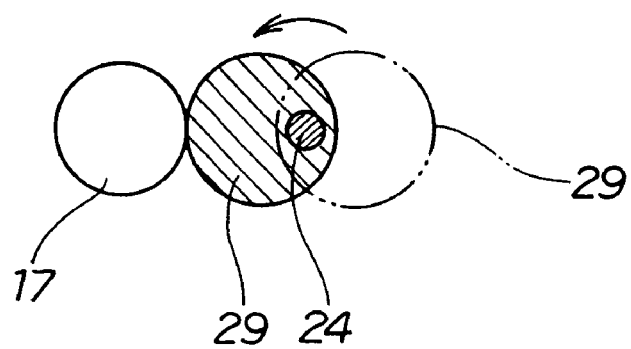
FIG. 8 is a view showing a circular cylinder used instead of the elliptic cylinder.

FIG. 8 shows an alternative to the positioning jig shown in FIG. 5 through FIG. 7. The positioning jig shown in FIG. 8 includes a circular cylinder 29 having a circular cross-section in place of the elliptic cylinder 25 forming the positioning portion 16. The rotary shaft 24 is eccentric to the circular cylinder, that is, is offset from a central axis of the circular cylinder 29. The positioning jig having the circular cylinder 29 shown in FIG. 8 is used in the same manner as the positioning jig 10C explained with reference to FIG. 5 through FIG. 7. Whether the electrode 17 is inclined or not can be visually checked for the same reason as applied to the positioning jig 10C in the third embodiment. The circular cylinder 29 is advantageous in that the cylinder 29 is cheaper than the elliptic cylinder 25 because the circular cylinder 29 is easier to manufacture than the elliptic cylinder 25. This leads to reduced cost for the positioning jig shown in FIG. 8.

Figure 9:
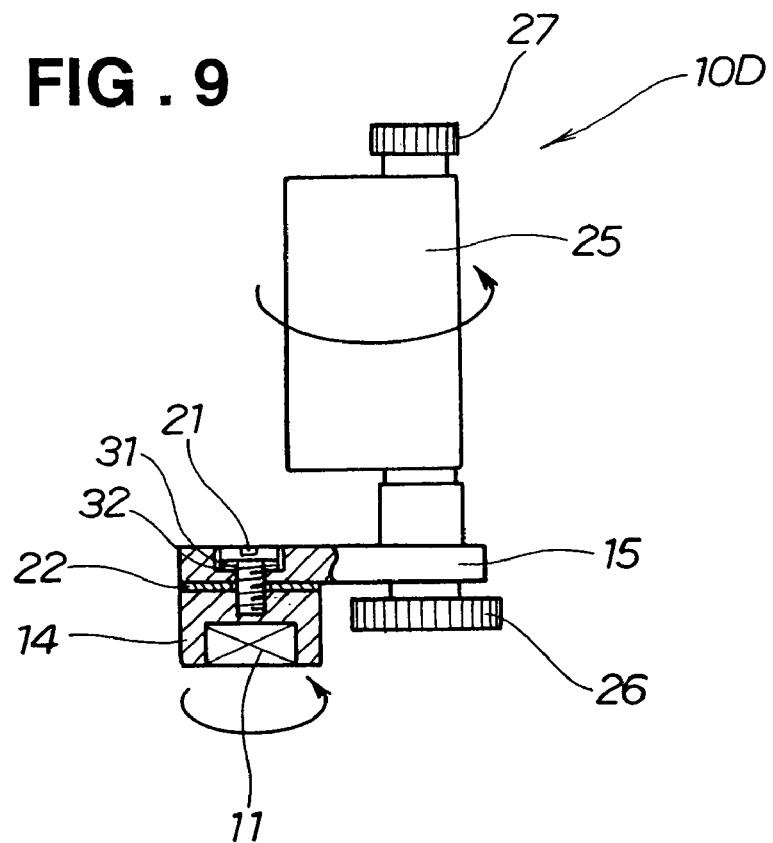
FIG. 9 is a view showing partly in cross-section a jig for positioning an electrode for spot welding according to a fourth embodiment of the present invention.

FIG. 9 shows a jig 10D (hereinafter referred to as "positioning jig 10D") for positioning an electrode of a spot welder according to a fourth embodiment of the present invention.

While, in the positioning jig 10C of FIG. 5 according to the third embodiment, the attaching portion 14 and the interconnecting portion 15 are integral with each other, in the positioning jig 10D according to the fourth embodiment, an attaching portion 14 and an interconnecting portion 15 are separated from each other, more specifically, the interconnecting portion 15 is rotatably attached to the attaching portion 14. It will be noted that the interconnecting portion 15 is rotatably attached to the attaching portion 14 in the same manner as the interconnecting portion 15 of the positioning jig 10B of FIG. 4 in the second embodiment, and hence descriptions of components used for the attachment of the interconnecting portion 15 to the attaching portion 14 will be omitted. The positioning jig 10D in the fourth embodiment has a structure obtained by combining a feature of the positioning jig 10B of FIG. 4 in the second embodiment with a feature of the positioning jig 10C of FIG. 5 in the third embodiment.

The turning of the interconnecting portion 15 relative to the attaching portion 14 assists adjustment of inclinations of an electrode with respect to the axes X—X and Y—Y. Moreover, whether the electrode is inclined can be readily checked by the elliptic cylinder 25 being turned into contact with the electrode.

Figure 10:
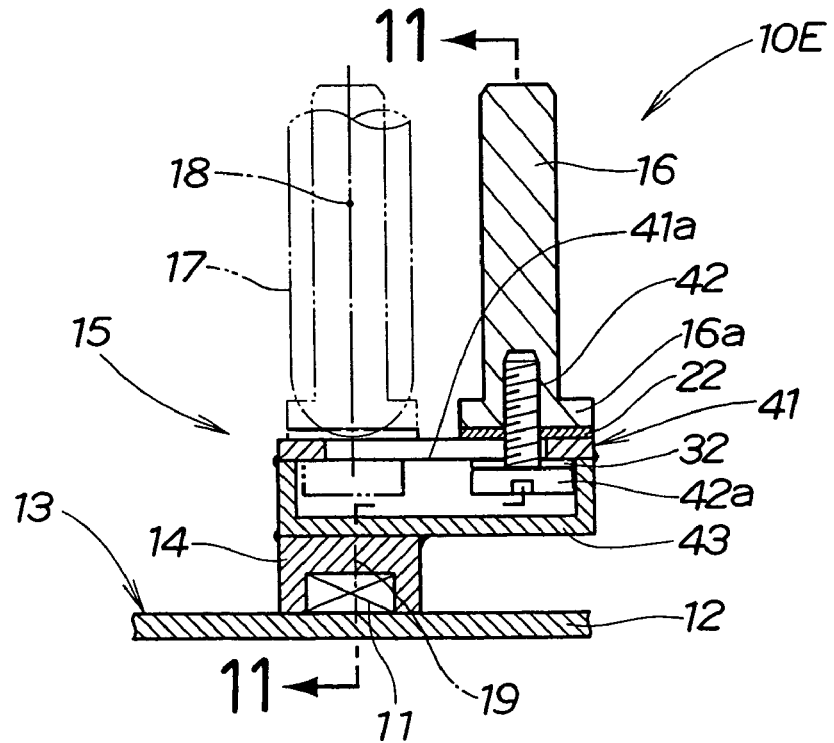
FIG. 10 is a cross-sectional view of a jig for positioning an electrode for spot welding according to a fifth embodiment of the present invention.
Figure 11:
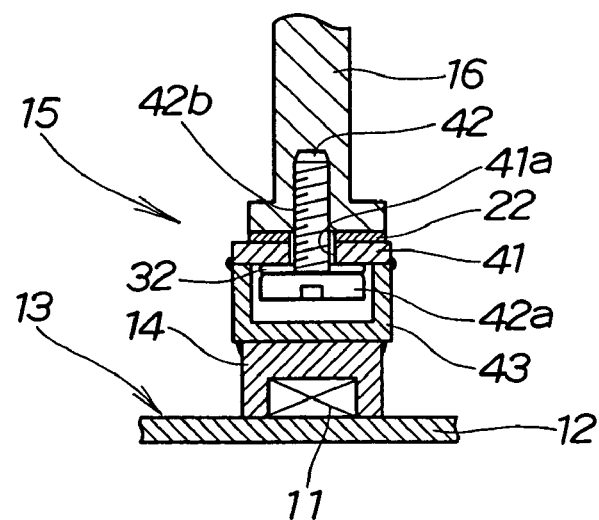
FIG. 11 is a cross-sectional view taken along line 11—11 of FIG. 10.

FIG. 10 and FIG. 11 show a jig 10E (hereinafter referred to as "positioning jig 10E") for positioning an electrode of a spot welder according to a fifth embodiment of the present invention.

In the positioning jig 10E according to the fifth embodiment, a central axis 19 of an attaching portion 14 generally coincides with a central axis 18 of an electrode 17. A positioning portion 16 is offset from the central axis 18 of the electrode 17. The positioning portion 16 is attached via an interconnecting portion 15 to the attaching portion 14. Reference numeral 32 denotes a plain washer.

The interconnecting portion 15 includes a guide plate 41 having a slit-shaped guide groove 41a for guiding a slide movement of the positioning portion 16, a slide screw 42 fitted with the guide groove 41a for sliding together with the positioning portion 16, and a U-shaped cross-sectional interconnecting body 43 accommodating therein a head 42a of the slide screw 42 and retaining the guide plate 41.

The interconnecting body 43 of the interconnecting portion 15 is secured to the attaching portion 14 by welding. The guide plate 41 is secured to the interconnecting body 43 by welding. Namely, the interconnecting portion 15 is secured to the attaching portion 14 by welding.

The positioning portion 16 is connected by the slide screw 42 to the interconnecting portion 15. More specifically, as shown in FIG. 11, the head 42a of the slide screw 42 is located in a space defined by the interconnecting body 43 of U-shaped cross-section. The slide screw 42 has a threaded portion 42b screwed through the slit-shaped guide groove 41a formed in the guide plate 41 and through a spacer 22 into a lower part 16a of the positioning portion 16, such that the positioning portion 16 is rotatably attached to the interconnecting portion 15.

The positioning portion 16 is attached to the interconnecting portion 15 in such a manner as to slide in a direction perpendicular to the central axis 19 of the attaching portion 14. In other words, the positioning portion 16 can be selectively set at a central axis position located on the central axis 19 of the attaching portion 14 and an offset position offset from the electrode 17. Thus, the position at which the positioning portion 16 is set can be changed over between the central axis position and the offset position, such that the electrode 17 can be positioned relative to a flat or curved workpiece 12 as will be discussed in relation to FIG. 12A and FIG. 12B. This means that the positioning jig 10E provide a suitable form of measurement of the inclination of the electrode not only when a workpiece is a flat but also when a workpiece is curved.

The positioning jig 10E in the fifth embodiment has a changeable measurement form. The measurement form can be changed merely by the slide movement of the positioning portion 16. Moreover, the inclination of the electrode 17 can be efficiently, easily measured because the positioning portion 16 can slide close to or into contact with the electrode 17.

By virtue of the lubricative spacer 22 interposed between the lower part 16a of the positioning portion 16 and the guide plate 41, the positioning portion 16 can rotate relative to the guide plate 41, that is, relative to the interconnecting portion 15. The positioning portion 16 of the positioning jig 10E according to the fifth embodiment may take the form of the elliptic cylinder 25 of the positioning jig 10C according to the third embodiment. In this case, the positioning portion 16 in the form of the elliptic cylinder 25 can rotate and slide towards the electrode 17 to thereby contact the electrode 17. Thus, the inclination of the electrode 17 can be easily visually checked, as in the case of the positioning jig 10C in the third embodiment.

Alternatively, the positioning portion 16 may slide without rotating relative to the interconnecting portion 15. In this case, the slide screw 42 becomes incapable of rotating, for example, provided that the head 42a of the slide screw 42 has a square shape configured to abut on a surface of an inner wall of the interconnecting body 43. By thus rendering the slide screw 42 incapable of rotating, rotation of the positioning portion 16 is prevented.

It will be understood that the guide plate 41 may be secured to the interconnecting body 43 by, for example, screws or adhesives rather than by the welding discussed in the fifth embodiment. Similarly, securing of the interconnecting portion 15 to the attaching portion 14 may be effected using, for example, screws or adhesives rather than the welding.

Now, discussion will be made with reference to FIG. 12A and FIG. 12B as to how the positioning jig 10E according to the fifth embodiment is used.

Figure 12A:
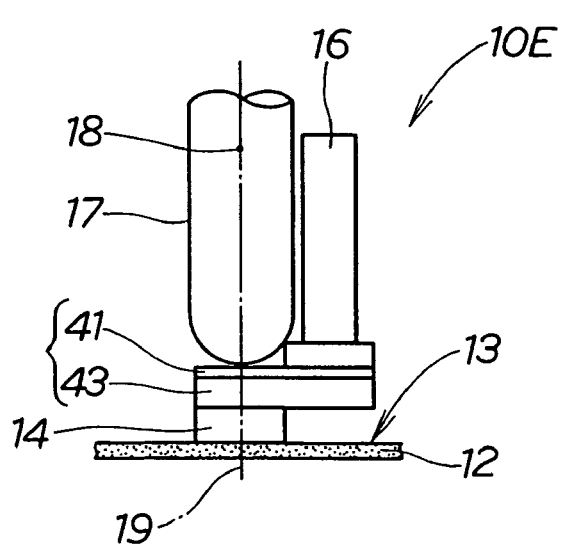
FIG. 12A and FIG. 12B show examples of use of the positioning jig shown in FIG. 10 in the fifth embodiment.

FIG. 12A shows that the positioning portion 16 of the positioning jig 10E is positioned when the jig 10E is used for a flat or curved workpiece 12 as in the case of the first and second embodiments. More specifically, the positioning portion 16 is set at a position offset from the central axis 19 of the attaching portion 14. The attaching portion 14 is attached a welding portion surface 13 of a workpiece 12. A tip end portion of the electrode 17 is placed on the interconnecting portion 15 such that the central axis 18 of the electrode 17 coincides with the central axis 19 of the attaching portion 14. An inclination of the electrode 17 is then measured with reference to the positioning portion 16, as in the case of the first and second embodiments. Provided that the positioning portion 16 is in the form of an elliptic cylinder described in the third embodiment, the positioning portion 16 is rotated into contact with the electrode 17 for checking an inclination of the electrode 17.

Figure 12B:
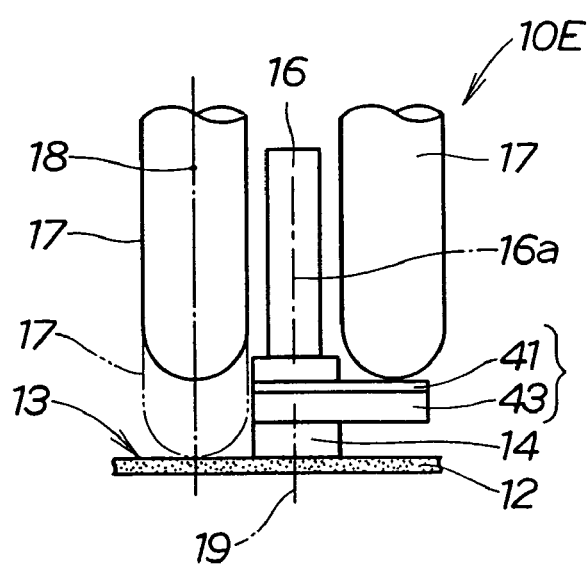

FIG. 12B shows that the positioning portion 16 is positioned when the positioning jig 10E is used for a flat workpiece 12 only.

Figure 13:
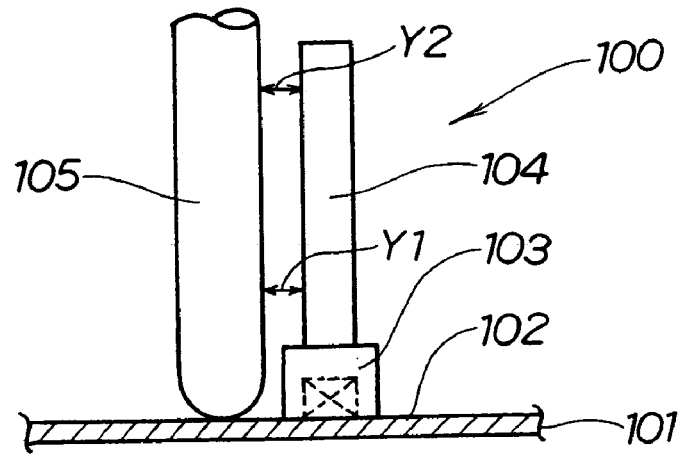
FIG. 13 is a view showing a conventional jig for positioning an electrode for spot welding.
Figure 14:
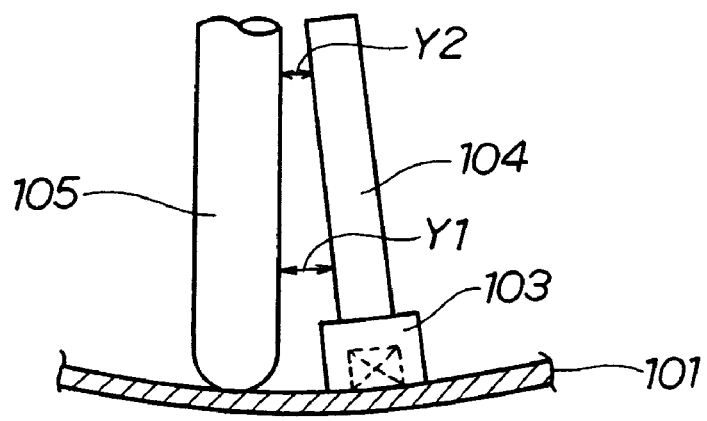
FIG. 14 is a view showing that the jig shown in FIG. 13 is used for a curved workpiece.

First, the attaching portion 14 is magnetically attached a welding portion surface 13 of the flat workpiece 12. The positioning portion 16 is then slid such that a central axis 16a of the positioning portion 16 coincides with the central axis 19 of the attaching portion 14. The positioning jig 10E is used in the same manner as the conventional positioning jig 100 shown in FIG. 13.

As discussed in relation to FIG. 12A and FIG. 12B, the positioning jig 10E is advantageous in that because the positioning jig 16 can slide between the two positions, two different forms of measurement of an inclination of the electrode can be provided. That is, the positioning jig 10E easily addresses various types of workpieces for measurement and adjustment of the inclination of the electrode, such that the electrode can be quickly appropriately positioned for spot welding.

Obviously, various minor changes and modifications of the present invention are possible in the light of the above teaching. It is therefore to be understood that within the scope of the appended claims the invention may be practiced otherwise than as specifically described.

What is claimed is:

1. A method for positioning an electrode by correcting an inclination of the electrode relative to surfaces of workpieces to be spot-welded together, the method comprising the steps of:

providing a jig including an attaching portion for temporarily attaching to the workpiece, a positioning portion disposed in parallel to a central axis of the attaching portion and offset from the central axis, and an interconnecting portion interconnecting the attaching portion and the positioning portion;

temporarily attaching the attaching portion to that part of a workpiece surface which is to be spot-welded;

setting the electrode on the interconnecting portion to bring a central axis of the electrode into coincidence with the central axis of the attaching portion;

correcting the inclination of the electrode with reference to the positioning portion to direct the electrode perpendicularly to the surface of the portion of the workpiece;

removing the jig from the workpiece; and advancing the electrode into contact with that part of the workpiece surface which is to be spot-welded.

2. The method according to claim 1, wherein the positioning portion includes a rotary shaft offset from the central axis of the attaching portion, and an elliptic or circular cylinder attached to the rotary shaft in eccentric relation to the rotary shaft, and wherein the inclination of the electrode is corrected with reference to the elliptic or circular cylinder.

3. The method according to claim 1, wherein the positioning portion is disposed on the interconnecting portion so as to slide in a direction perpendicular to the central axis of the attaching portion between a central axis position on the central axis of the attaching portion and an offset position offset from the central axis position, and wherein the step of setting the electrode on the interconnecting portion comprises sliding the positioning portion along the interconnecting portion to select one of the central axis position and the offset position in correspondence to a configuration of the workpiece surface.

* * * * *